(12) United States Patent
Kasslin

(10) Patent No.: US 12,452,214 B2
(45) Date of Patent: Oct. 21, 2025

(54) NETWORK DEVICE PROTECTION

(71) Applicant: Cujo LLC, Walnut, CA (US)

(72) Inventor: Kimmo Kasslin, Espoo (FI)

(73) Assignee: Cujo LLC, Covina, CA (US)

( * ) Notice: Subject to any disclaimer, the term of this patent is extended or adjusted under 35 U.S.C. 154(b) by 232 days.

(21) Appl. No.: 17/962,790

(22) Filed: Oct. 10, 2022

(65) Prior Publication Data

US 2023/0164119 A1    May 25, 2023

Related U.S. Application Data

(60) Provisional application No. 63/282,933, filed on Nov. 24, 2021.

(51) Int. Cl.
*H04L 9/40* (2022.01)

(52) U.S. Cl.
CPC ...... *H04L 63/0272* (2013.01); *H04L 63/0281* (2013.01); *H04L 63/166* (2013.01); *H04L 63/306* (2013.01)

(58) Field of Classification Search
CPC ............. H04L 63/0272; H04L 63/0281; H04L 63/166; H04L 63/306; H04L 63/029; H04L 63/04; H04L 63/1441; H04L 63/1416
See application file for complete search history.

(56) References Cited

U.S. PATENT DOCUMENTS

| | | | | |
|---|---|---|---|---|
| 9,338,192 | B1* | 5/2016 | He | H04L 67/563 |
| 10,009,230 | B1* | 6/2018 | Li | H04L 67/1023 |
| 10,424,034 | B1* | 9/2019 | Wang | G06F 21/6263 |
| 2006/0075114 | A1* | 4/2006 | Panasyuk | H04L 67/56 |
| | | | | 709/227 |
| 2010/0318665 | A1* | 12/2010 | Demmer | H04L 69/40 |
| | | | | 709/227 |
| 2014/0137254 | A1* | 5/2014 | Ou | H04L 63/145 |
| | | | | 726/24 |
| 2015/0058916 | A1 | 2/2015 | Rostami-Hesarsorkh et al. | |
| 2017/0093802 | A1* | 3/2017 | Norum | H04L 63/0428 |
| 2018/0097891 | A1* | 4/2018 | Calo | H04L 67/142 |
| 2024/0121329 | A1* | 4/2024 | Mihály et al. | H04L 69/326 |

FOREIGN PATENT DOCUMENTS

| | | |
|---|---|---|
| EP | 2985974 A1 | 2/2016 |
| EP | 3065371 A1 | 2/2016 |

OTHER PUBLICATIONS

Extended European Search Report for European Patent Application No. 22200719.7, mailed Jan. 10, 2023, 7 pages.

\* cited by examiner

*Primary Examiner* — Amie C. Lin
(74) *Attorney, Agent, or Firm* — Dority & Manning, P.A.

(57) ABSTRACT

A method, apparatus, and a computer-readable medium for network device protection. The method includes: intercepting present network data related to a present data connection of a user apparatus; analyzing the present network data; and in response to determining that the user apparatus utilizes a privacy feature in the present data connection implemented by a first internet relay and a second internet relay, blocking the present data connection.

20 Claims, 7 Drawing Sheets

NETWORK DEVICE PROTECTION

RELATED APPLICATION

This application claims the benefit of provisional patent application Ser. No. 63/282,933, filed Nov. 24, 2021, the disclosure of which is hereby incorporated herein by reference in its entirety.

BACKGROUND

Network protocols used by user apparatuses are being provided with various privacy features. They increase the privacy but at the same time complicate legitimate cybersecurity control (including parental control or enterprise level control). Consequently, the network protocols and their privacy features require consideration and further sophistication to balance the privacy vs. the legitimate cybersecurity control.

SUMMARY

According to an aspect of the disclosure, there is provided subject matter of independent claims.

One or more examples of implementations are set forth in more detail in the accompanying drawings and the detailed description.

BRIEF DESCRIPTION OF DRAWINGS

Some examples will now be described with reference to the accompanying drawings, in which.

DETAILED DESCRIPTION

The following description discloses examples. Although the specification may refer to "an" example in several locations, this does not necessarily mean that each such reference is to the same example(s), or that the feature only applies to a single example. Single features of different examples may also be combined to provide other examples. Words "comprising" and "including" should be understood as not limiting the described examples to consist of only those features that have been mentioned as such examples may contain also features and structures that have not been specifically mentioned. The examples and features, if any, disclosed in the following description that do not fall under the scope of the independent claims should be interpreted as examples useful for understanding various examples and implementations of the invention.

Unencrypted domain name system (DNS) queries and unencrypted server name indication (SNI) information from hypertext transfer protocol secure (HTTPS) handshakes may be used to extract data, such as fully qualified domain names (FQDN), uniform resource identifiers (URL) or internet protocol (IP) data of end users. However, if the DNS query and the SNI portion of the HTTPS handshake are encrypted, the possibility to extract the FQDN directly from the HTTPS handshake becomes impossible and service providers are not able to detect the FQDN that is being accessed over the internet by intercepting and inspecting the DNS traffic. The FQDN enables each network entity connected to the internet to be uniquely identified and located in the network. This is useful in many ways: to provide security, parental control and privacy services, to enable the maintenance of the network, and to manage subscribers of the network.

Service vendors have made the privacy features common. The privacy features have a disrupting impact to the efficacy of all network-based analysis techniques that rely on the network-level visibility of the URL, FQDN or IP information. These privacy features act similarly to virtual private network (VPN) tunnels and encapsulate the original network traffic within an encrypted tunnel. The privacy feature may be implemented by using a first internet relay of a first service provider to replace an IP address of the user apparatus with an approximate geographical location, and then using a second internet relay of a second service provider to decrypt a connection request from the user apparatus. This ensures that the traffic leaving the user apparatus is encrypted and all requests are routed through two separate internet relays. At the same time, it will make the network traffic-based security analysis more difficult.

Figure 1A:
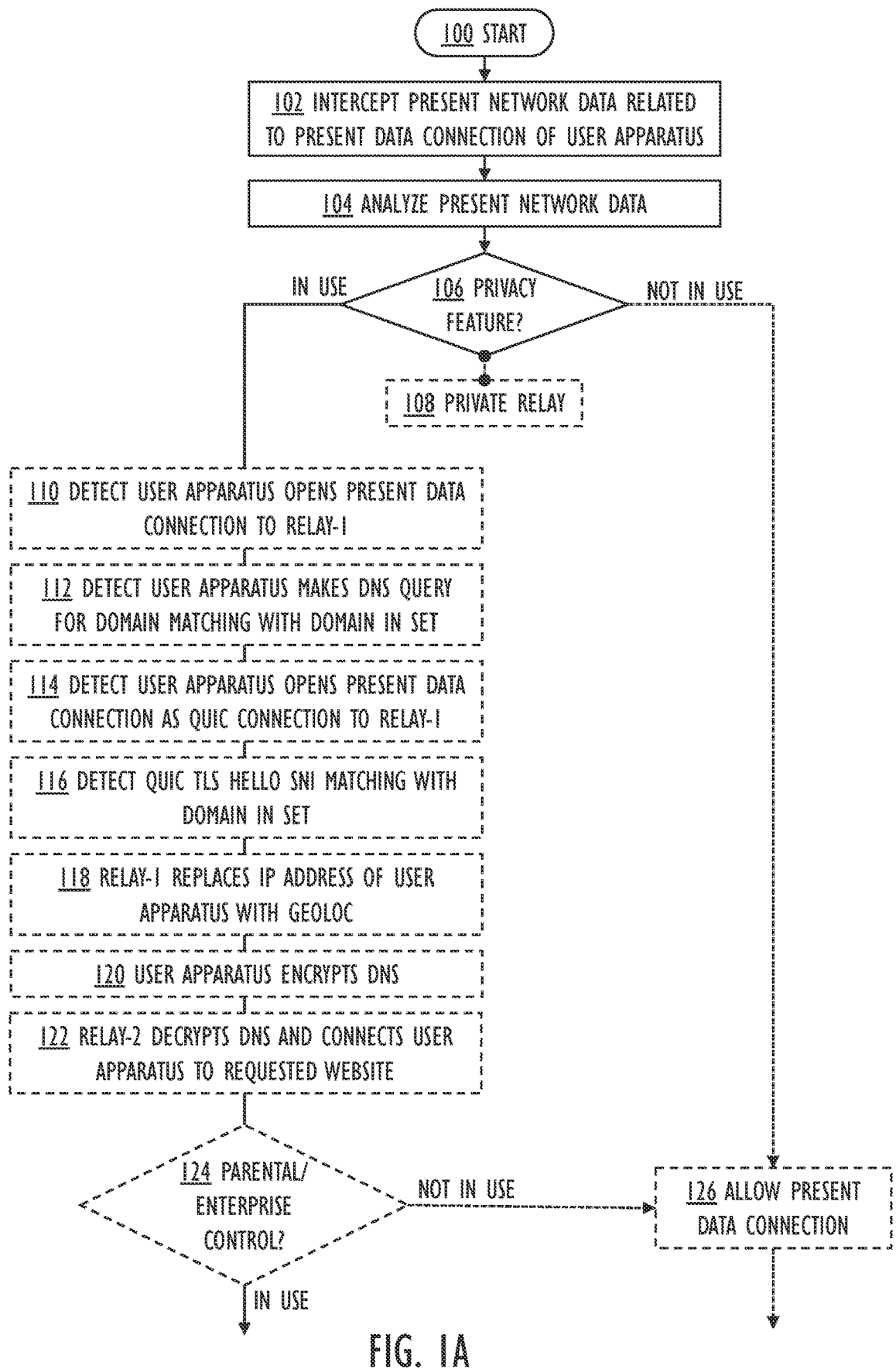
FIG. 1A and FIG. 1B are flowcharts illustrating examples of a method.
Figure 1B:
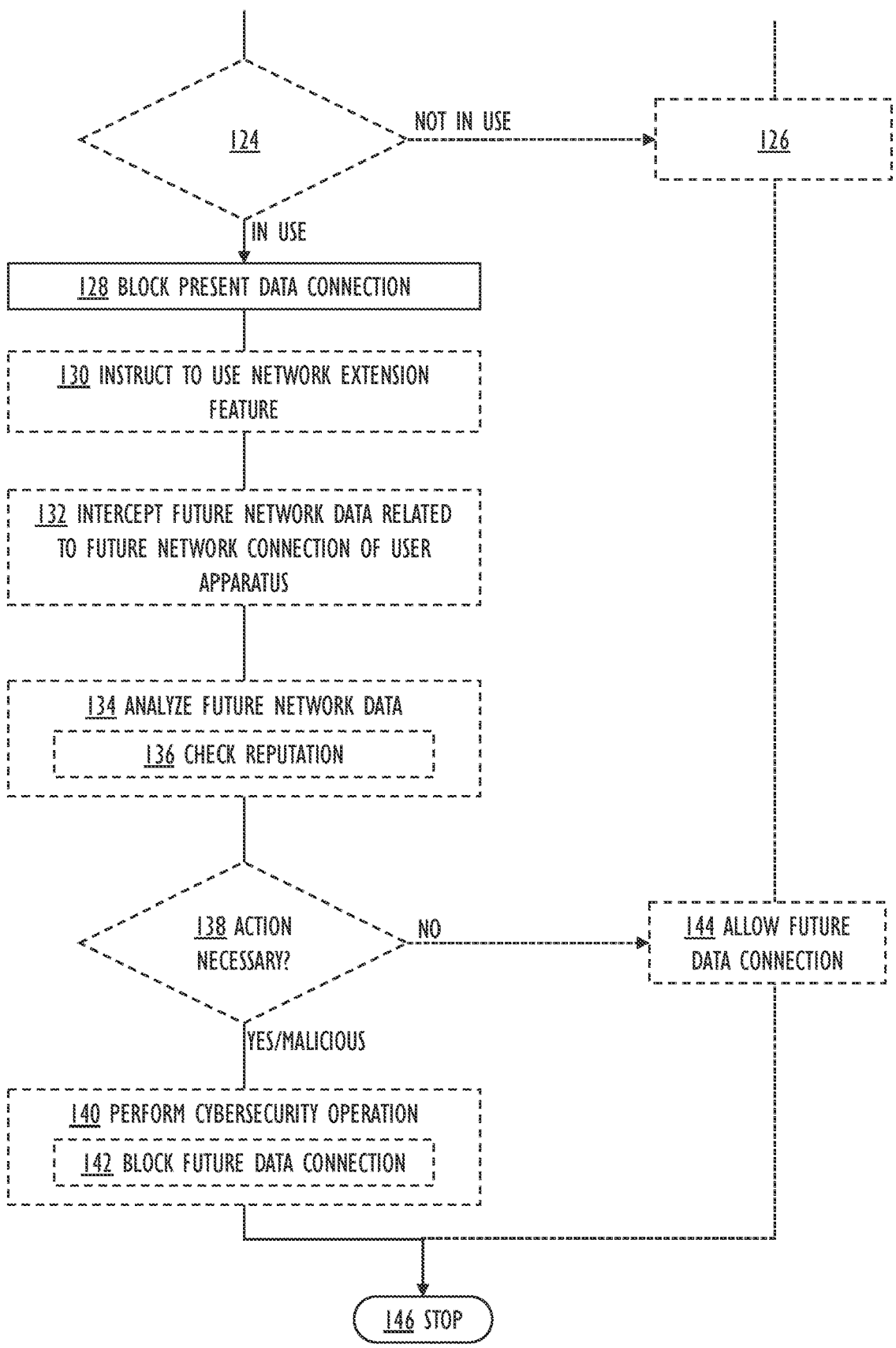

FIG. 1A and FIG. 1B illustrate a computer-implemented method.

The method starts in 100 and ends in 146.

The execution of the method may continue in principle infinitely by looping from latter operations such as from 126, 128, 130, 140, 142, or 144 back to the first operation 102.

The operations are not strictly in chronological order in FIG. 1A and FIG. 1B, i.e., no special order of operations is required, except where necessary due to the logical requirements for the processing order. In such a case, the synchronization between operations may either be explicitly indicated, or it may be understood implicitly by the skilled person. If no specific synchronization is required, some of the operations may be performed simultaneously or in an order differing from the illustrated order. Other operations may also be executed between the described operations or within the described operations, and other data besides the illustrated data may be exchanged between the operations.

First, present network data related to a present data connection of a user apparatus is intercepted 102. The data connection is a (packet-switched) network connection, wherein information is transmitted by sending and receiving. The data connection implements (point-to-point) data communication from the user apparatus to another network node. The data communication is transferred over one or more communication channels (implemented by copper wires, optical fibers, and wireless communication using radio spectrum, for example). The intercepting 102 refers to user-approved lawful interception or monitoring of the data connection, with a purpose and goal of increasing cybersecurity related to the user apparatus and its operating environment. The intercepting 102 may be implemented so that the present data connection is passively monitored, i.e., the present data connection is not affected by the intercepting. Alternatively, if needed, the intercepting may include a seizing of the present data connection, i.e., the present data connection is actively influenced so that connection and/or requests are blocked until it may be decided whether a cybersecurity action is required.

Next, the present network data is analyzed 104. The present data connection may be seized for the duration of analyzing 104.

In response to determining that the user apparatus utilizes a privacy feature in the present data connection implemented by a first internet relay and a second internet relay, the present data connection is blocked 128. The determination is based on analyzing 104 the present network data.

The result of the analyzing 104 may be tested with a test in block 106: if the test indicates that the privacy feature is in use, the present data connection is blocked 128, or else if the test indicates that the privacy feature is not in use, the present data connection is allowed 126.

Figure 2:
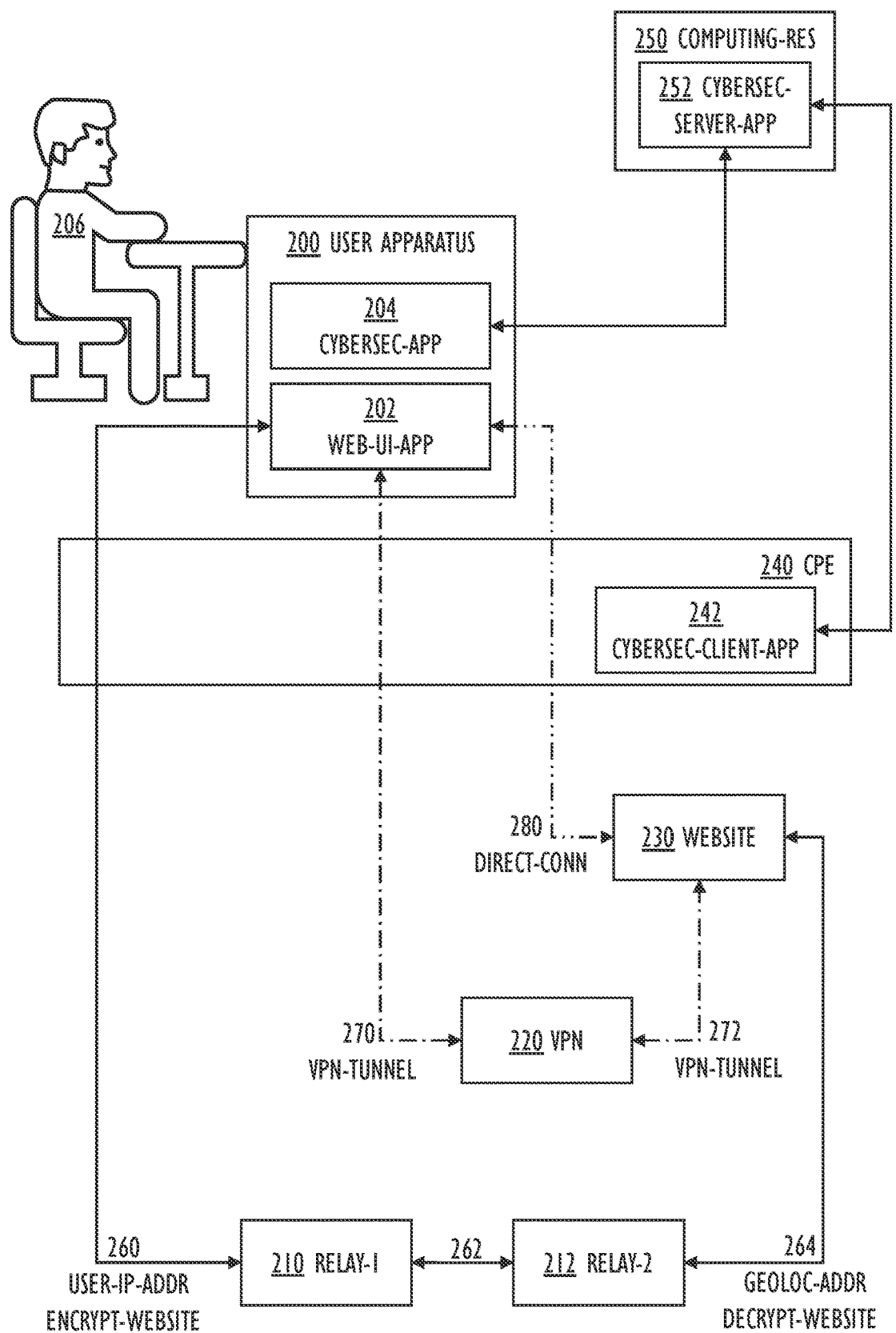
FIG. 2 is a block diagram illustrating an example implementation environment for the method.

FIG. 2 illustrates an example implementation environment for the method.

A web user interface application 202 (such as a browser or a mobile app) is running in the user apparatus 200. The user 206 wishes to use a service implemented by a website 230.

As already explained, the privacy feature of interest is implemented by the first internet relay 210 and the second internet relay 212.

Figure 3:
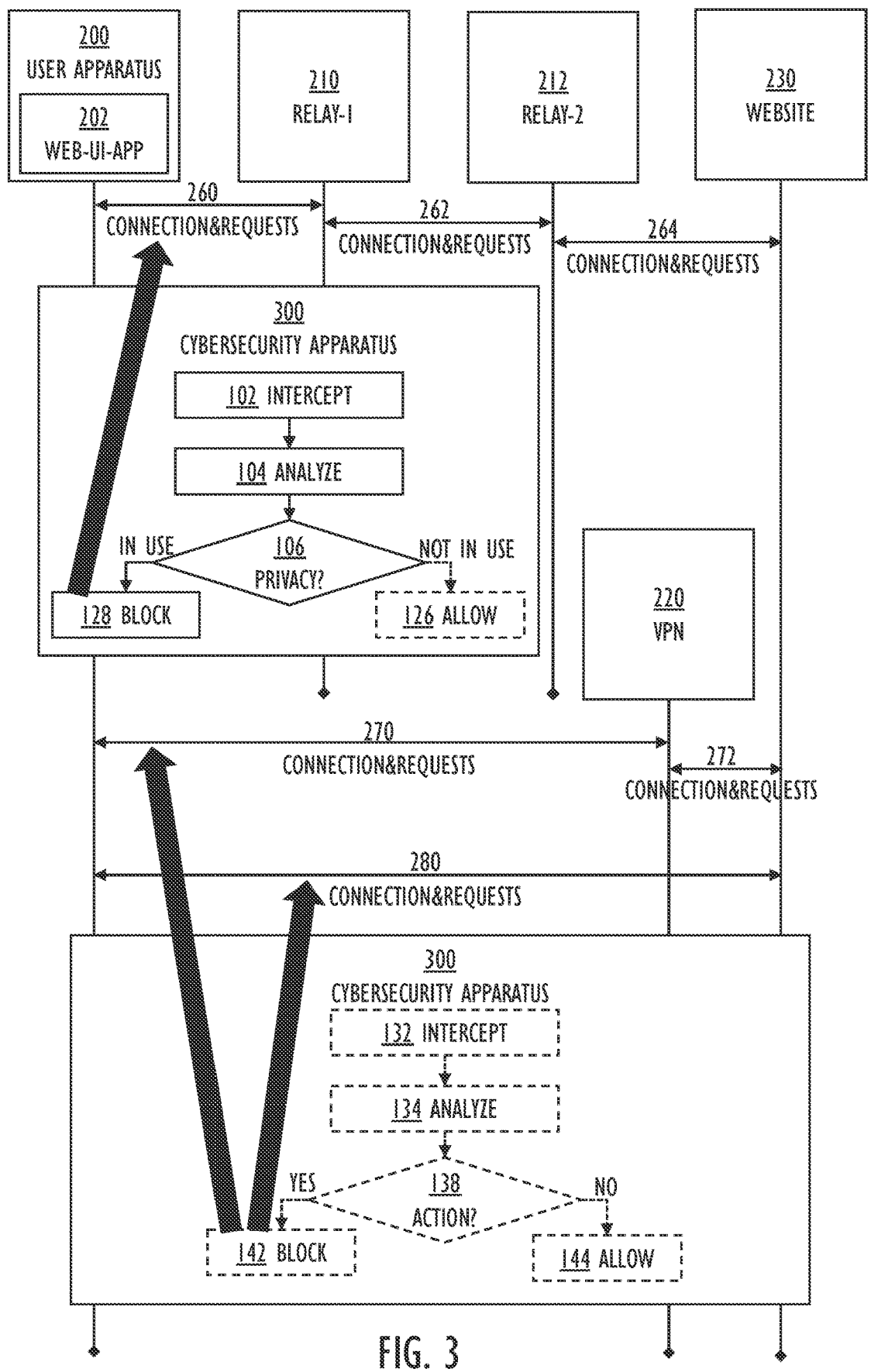
FIG. 3 is a sequence chart illustrating communication between various actors of the method.

FIG. 3 illustrates communication between various actors of the method. The present data connection may first be created using packet protocols to establish a connection 260 from the user apparatus 200 to the first internet relay 210.

The packet protocols include, but are not limited to, TCP/IP (Transmission Control Protocol/Internet Protocol), UDP (User Datagram Protocol), and QUIC™, which establishes a multiplexed transport on top of the UDP.

Various HTTP/HTTPS (Hypertext Transfer Protocol/Hypertext Transfer Protocol Secure) requests may then be transferred in the connection 260 (using TCP streams or UDP datagrams, for example).

In the Internet protocol suite, the connection is operated in a link layer, an internet layer, and a transport layer, and the requests are operated in an application layer.

As shown in FIG. 2 and FIG. 3, for the present data connection, the first internet relay 210 establishes a connection 262 and transfers requests to the second internet relay 212. Furthermore, for the present data connection, the second internet relay 212 establishes a connection 264 and transfers requests to the website 230. The connection 260 may be the part of the present data connection that is blocked 128 or allowed 126 as it is the part of the data connection that may be seen, intercepted, and blocked by the cybersecurity apparatus 300.

The analyzing 104 of the present network data, and the test in 106 may check one or more predetermined conditions to detect the use of the privacy feature in the present data connection implemented by the first internet relay 210 and the second internet relay 212. Consequently, determining that the user apparatus 200 utilizes the privacy feature comprises detecting fulfilment of one or more of the following four predetermined conditions.

The first predetermined condition is fulfilled, if it is detected 110 that the user apparatus 200 opens the present data connection to the first internet relay 210 based on an identity of the first internet relay 210 matching with an identity in a set of known identities associated with the privacy feature.

The second predetermined condition is fulfilled, if it is detected 112 that the user apparatus 200 makes a domain name system (DNS) query for a domain matching with a domain in a set of known domains associated with the privacy feature. In an example, the Apple® iCloud Private Relay 108 implements the privacy feature, and the domain for the first internet relay 210 is mask.icloud.com or mask-h2.icloud.com, for example.

The third predetermined condition is fulfilled, if it is detected 114 that the user apparatus 200 opens the present data connection to the first internet relay 210 as a QUIC™ connection. QUIC™ is the name of an encrypted connection-oriented protocol that operates as defined by the Internet Engineering Task Force (IETF®) and uses the UDP.

The fourth predetermined condition is fulfilled, if a QUIC™ transport layer security (TLS) client hello server name indication (transmitted from the user apparatus 200) is detected 116 matching with a domain in a set of known domains associated with the privacy feature.

In this way, the use of the privacy feature and an identification of a private relay session establishment is detected by analyzing a QUIC™ network protocol session. This may start with a basic TLS client hello message wherein the SNI matches mask.icloud.com identity or a similar identity that uniquely identifies the private relay service. As the analyzing 104 has the capability to understand the QUIC™ session negotiation process, it is possible to reliably identify the session establishment in a generic way.

The privacy feature may comprise a private relay. The private relay may utilize the first internet relay 210 and the second internet relay 212. Such private relay is different from the virtual private network (VPN), which uses a VPN client running in the user apparatus 200 to create a secure and encrypted connection to a single VPN server. The private relay is also different from a TOR (The Onion Router) network, which uses onion routing, which encrypts and then randomly transmits the network traffic through numerous volunteer-operated relays around the world.

In the private relay, the first internet relay 210 sees the IP address of the user apparatus 200, but the visited website name is not visible as it is encrypted. The first internet relay 210 replaces 118 the IP address of the user apparatus 200 with an approximate geographic location area (such as a geolocation address) of the user apparatus 200.

The geolocation address may define a geographic area representing the IP address of the user apparatus 200. The geolocation address may be a geohash.

The user apparatus 200 encrypts 120 one or more domain name system (DNS) records related to the present data connection due to the use of the privacy feature, and the second internet relay 212 decrypts 122 the one or more DNS records to connect the user apparatus 200 to a requested website 230 defined in the one or more DNS records.

The second internet relay 212 sees only the geolocation address, but decrypts the visited website name. In this way, no single node (=the first internet relay 210, the second internet relay 212, the website 230) knows both the IP address of the user apparatus 200 and the visited website name.

In general, the privacy feature works by routing communications through two internet relays. The network data is encrypted and then sent to a network of a first service provider, which then prevents the internet service provider (ISP) of the user apparatus 200 from seeing any of the communication requests sent by the user apparatus 200. In the proxy server of the first service provider, the DNS request and the IP address of the user apparatus 200 are separated, and the IP address is retained by the first service provider and the DNS request is passed on, encrypted, to a trusted partner that has the decryption key, along with a fake intermediary IP address that is based on the approximate location of the user apparatus 200. This means that the first service provider knows the IP address of the user apparatus 200 but not the name of the website visited, and that the trusted partner knows the website visited but not the IP address of the user apparatus 200.

The first internet relay 210 may comprise an ingress proxy server, and the second internet relay 212 may comprise an egress proxy server.

The privacy feature may be implemented at least partly as defined in the specification "Oblivious DNS over HTTPS", RFC 9230, June 2022, which describes a protocol that allows clients to hide their IP addresses from DNS resolvers via proxying encrypted DNS over HTTPS (DoH) messages. This improves privacy of DNS operations by not allowing any one server entity to be aware of both the client IP address and the content of DNS queries and answers. At the time of the writing of this patent application, RFC 9230 is available in the following internet location: datatracker.ietf.org/doc/rfc9230/.

In addition to the utilizing the privacy feature, a second condition may need to be met for the blocking 128. The second condition is met if the user apparatus 200 is subjected to a parental or enterprise cybersecurity control function. As illustrated in FIG. 1A, the second condition may be implemented with a test in block 124: if the test indicates that the parental or enterprise cybersecurity control function is in use for the user apparatus 200, the present data connection is blocked 128, or else if the test indicates that the parental or enterprise cybersecurity function is not in use for the user apparatus 200, the present data connection is allowed 126.

As shown in FIG. 1B, subsequent to blocking 128 the present data connection, the user apparatus 200 may be instructed 130 to use a network extension feature instead of the privacy feature for a future data connection 270+272/ 280. This may be done so that the user apparatus 200 is signaled by the cybersecurity apparatus 300 to switch off the privacy feature, and switch on the network extension feature.

Then, future network data related to a future data connection of the user apparatus 200 may be intercepted 132, and the future network data may be analyzed 134. In response to determining that a cybersecurity action is necessary, a cybersecurity action is performed 140 related to one or more of the future data connection, the user apparatus 200. The determination is based on analyzing 134 the future network data. The cybersecurity action may be performed 140 to protect the user apparatus 200, wherein the cybersecurity action comprises providing one or more security-related features for a local network 402, and/or for the user apparatus 200. The security-related features may protect the user apparatus 200 but also other network nodes 240 from a possible security threat. The cybersecurity action may block or prevent communication to and from the user apparatus 200, or provide security, parental control, enterprise level control, or privacy protection measures for the user apparatus 200.

The result of the analyzing 134 may be tested with a test in block 138: if the test indicates that the cybersecurity action is necessary, the cybersecurity action is performed 140, or else if the test indicates that the cybersecurity action is not necessary, the future data connection is allowed 144.

Analyzing 134 the future network data may further comprise checking 136 a reputation of a website related to the future data connection, and performing 140 the cybersecurity action related to one or more of the future data connection, and the user apparatus 200 may further comprise blocking 142 the future data connection in response to determining that the reputation of the website is malicious, or else (if the reputation is trustworthy) allowing 144 the future data connection.

A cache of website reputation data may be maintained in the cybersecurity apparatus 300. Alternatively, or additionally, a database communicatively coupled with the cybersecurity apparatus 300 is configured to store website reputation data. The database may be a local instance for offline use by the cybersecurity application 204 or the cybersecurity client application 242, or the database may be maintained by the cybersecurity server application 252 to remotely serve online a plurality of cybersecurity applications 204 and/or cybersecurity client applications 242. Besides the website reputation data, the database may be configured to store network data such as any network-based identification data, metadata, attributes, values, MAC (Medium Access Control) addresses, hostnames, other data related to data connection requests, state information of the data connection, domain data of the websites.

If the reputation is unknown, an analysis may be performed on the fly. A trustworthiness score for the website may be based on an analysis of the website. The site analysis may be performed by a machine learning algorithm. An address of the website may be detected from the intercepted future network data. Checking reputation of the website may be based on an address of the website, such as an internet protocol (IP) address, a fully qualified domain name (FQDN), a universal resource locator (URL). Features for a supervised machine learning algorithm may include features extracted from a web crawler (or a spider, which is an internet bot that systematically browses pages and the WWW in general to gather data from a variety of online sources), an age of the website, SSL/TLS (Secure Sockets Layer/Transport Layer Security) certificate trustworthiness utilized by the website, a popularity of the website.

Naturally, the analyzing 134 and the test 138 may be more elaborate. The reputation of the website may have three values, trustworthy, malicious, or questionable. If the reputation of the web size is questionable, the future data connection may be seized, and a warning related to the future data connection is transmitted to a cybersecurity application 204 running in the user apparatus 200. Additionally, a response from the cybersecurity application 204 may be received and based on the response, the future data connection is allowed 144, or blocked 142.

The network extension may operate without a virtual private network (VPN) feature, in which case the method is executed in one or more of a customer-premises equipment (CPE) 240, a network accessible computing resource 250, or the user apparatus 200. Alternatively, the network extension may operate with the virtual private network feature, in which case the method is executed in one or more of a customer-premises equipment (CPE) 240 acting as a virtual private network server, or the user apparatus 200. As shown in FIG. 2, a VPN server 220 may implement the future data connection with VPN tunnels 270, 272 from the user apparatus 200 to the website 230. The CPE 240 may also enable the use of VPN for the user apparatus 200. In response to detecting 104, 106 the use of the privacy feature, the CPE 240 may signal to the cybersecurity server application 252 that a local VPN of the user apparatus 200 should be activated. This may be implemented by using a push notification, for example. The cybersecurity client application 242 in the local network 402 may receive this signal and activate the VPN. Alternatively, the cybersecurity application 204, 204A, 204B, of the user apparatus 200 may analyze the network traffic itself and enable the local VPN based on the analysis.

In an example, the privacy feature may be implemented by Apple® iCloud Private Relay, and the network extension feature may be implemented by Apple® NetworkExtension framework. The use of the network extension feature may prohibit the user apparatus 200 from using the privacy feature for the future network connection. In an example, the network extension operating with the VPN feature prevents the network traffic that is required for providing security-related features from being sent by using the privacy feature.

Figure 4:
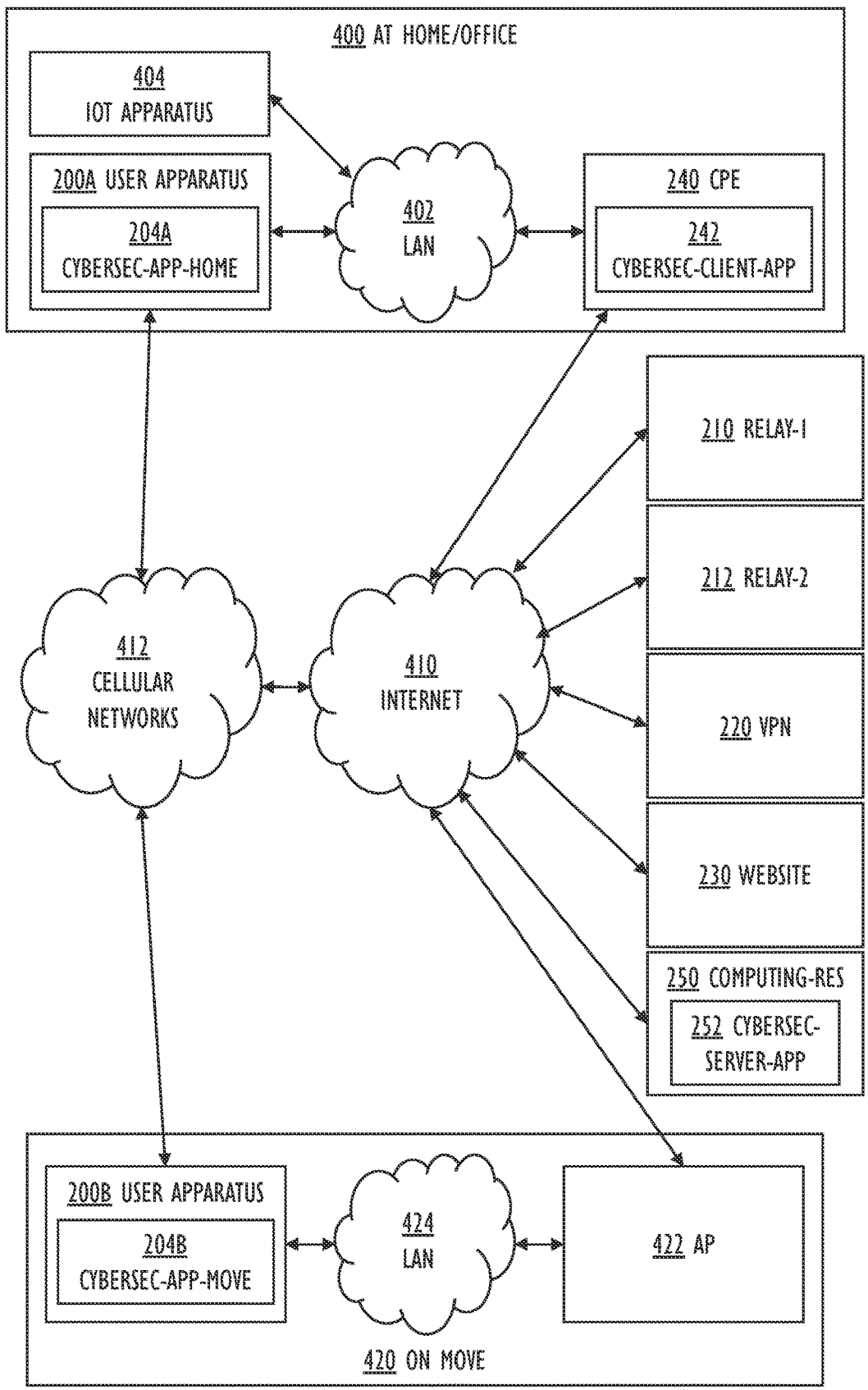
FIG. 4 is a block diagram illustrating an example operation environment.

FIG. 4 illustrates an example operation environment.

Two basic use cases are described: at home or office 400, and on the move 420.

The Internet 410 uses the Internet protocol suite including TCP/IP and UDP to globally connect computer networks so that communication is enabled between user apparatuses 200A, 200B and various services provided typically by the websites 230. The Internet 410 comprises public networks, private networks, academic networks, business networks, government networks, etc. interlinked with various networking technologies. The various services provide access to vast WWW (World Wide Web) resources, wherein webpages may be written with HTML (Hypertext Markup Language) or XML (Extensible Markup Language) and accessed by a browser or another application (such as a mobile app) running in the user apparatus 200A, 200B.

From the cybersecurity point of view, the Internet services may be divided between legitimate services and fraud services implemented by the websites 230. Legitimate services operate according to moral and ethical standards enforced by law, police, or social pressure. Fraud services do not follow moral and ethical standards, and often perform criminal acts to disclose, steal or damage electronic data, software or hardware, or disrupt or misdirect services provided by the electronic data, software, and hardware. Fraud services may be fraudulent to the core, i.e., their only reason for existence is to perform malicious acts, but they may also be legitimate services as such, but being infected with malicious software so as to enable criminal acts. The criminal acts in general include, but are not limited to using a backdoor to bypass security mechanisms, make a denial-of-service attack (DoS), also as a distributed denial-of-service (DDoS), installing software worms or keylogger, eavesdropping a communication, phishing, spoofing, tampering, installing malware, etc.

Note that different service providers, such as network operators, cloud service operators, and cybersecurity operators, just to name a few, may operate and/or manage the various network nodes 210, 212, 220, 230, 240, 250.

Device identification, which may be defined as a capability to detect various apparatuses, such as the user apparatuses 200A, and IoT (Internet of Things) apparatuses 404, in a home/office LAN 402, also increases the cybersecurity. Traditionally, a MAC (Medium/Media Access Control protocol) address assigned by a device manufacturer and used by wireless radio signals within the LAN has been used for the device identification. However, MAC spoofing, which anonymizes and randomizes the MAC address to increase privacy, hinders the device identification based on the MAC address. Machine learning algorithms may use a number of other data items (such as device-specific unique radio interface characteristics, other current and historic unique identifiers related to the apparatus 200A, 404 and its communication) to enable the device identification despite of the MAC spoofing.

Numerous cellular networks (or mobile networks) 412 provide access to the Internet 410 for the user apparatus 200A, 200B (both at home or office 400 and on the move 420) by providing a wireless link in a radio cell implemented by a base station (or a base transceiver station, an eNodeB (eNB), a gNodeB (gNB), or an access point, for example) implemented using a standard technology, including, but not being limited to a cellular radio network (GSM, GPRS, EGPRS, WCDMA, UMTS, 3GPP, IMT, LTE, LTE-A, 3G, 4G, 5G, 5G NR (5G New Radio), 6G, etc.), a wireless local area network (such as WLAN (Wireless Local Area Network), Wi-Fi, etc.), or a short-range radio network (such as Bluetooth or Bluetooth Low Energy (BLE), etc.). The use of the cellular radio network may necessitate use of a subscriber identity module (SIM), either as a physical chip, or as an embedded-SIM (eSIM), for example.

CPE (Customer-Premises Equipment) 240 is located at home or office 400 of a user of the user apparatus 200A. CPE 240 is stationary equipment connected to a telecommunication circuit of a carrier (such as a broadband service provider) at a demarcation point. The demarcation point may be defined as a point at which the public Internet 410 ends and connects with a LAN (Local Area Network) 402 at the home or office of the user of the user apparatus 200A. In this way, the CPE 240 acts as a network bridge.

CPE 240 may include one or more functionalities of a router, a network switch, a residential gateway, a set-top box, a fixed mobile convergence product, a home networking adapter, an Internet access gateway, or another access product distributing the communication services locally in a residence or in an enterprise via a (typically wireless) LAN and thus enabling the user of the user apparatus 200A to access communication services of the broadband service provider. Note that the CPE 240 may also be implemented with wireless technology, such as a 5G CPE 240 configured to exchange a 5G cellular radio network signal with a base station operated by the broadband service provider, and generate a Wi-Fi (or WLAN) or wired signal to implement the LAN 402 to provide access for the user apparatus 200A. Furthermore, the 5G CPE 240 performs the conversion between the 5G cellular radio network signal and the Wi-Fi or wired signal.

As shown in FIG. 4, besides the one or more user apparatuses 200A, one or more IoT (Internet of Things) apparatuses 404 may be communicatively coupled with the LAN 402. The IoT apparatus 404 may include technology (sensors, communication technology, data processing) to enable smart appliances (lighting systems, thermostats, home security systems, remote health monitoring systems, smart fridges, smart toasters, etc.), IP cameras, or network attached storage (NAS), for example.

On the move 420, the user of the user apparatus 200B may access the Internet 410 via the cellular networks 412, or via a local access point 422 implementing a local area network 424. The access point 422 may be provided with similar technology as used by the CPE 240. The access point 422 may be located at a bus station, at a train station, at an airport, at a hotel room, at a hotel lobby, at a conference or fair center, at a shopping mall, at a cafe, at a museum, at a rented apartment, or at another public or private location.

Figure 5A:
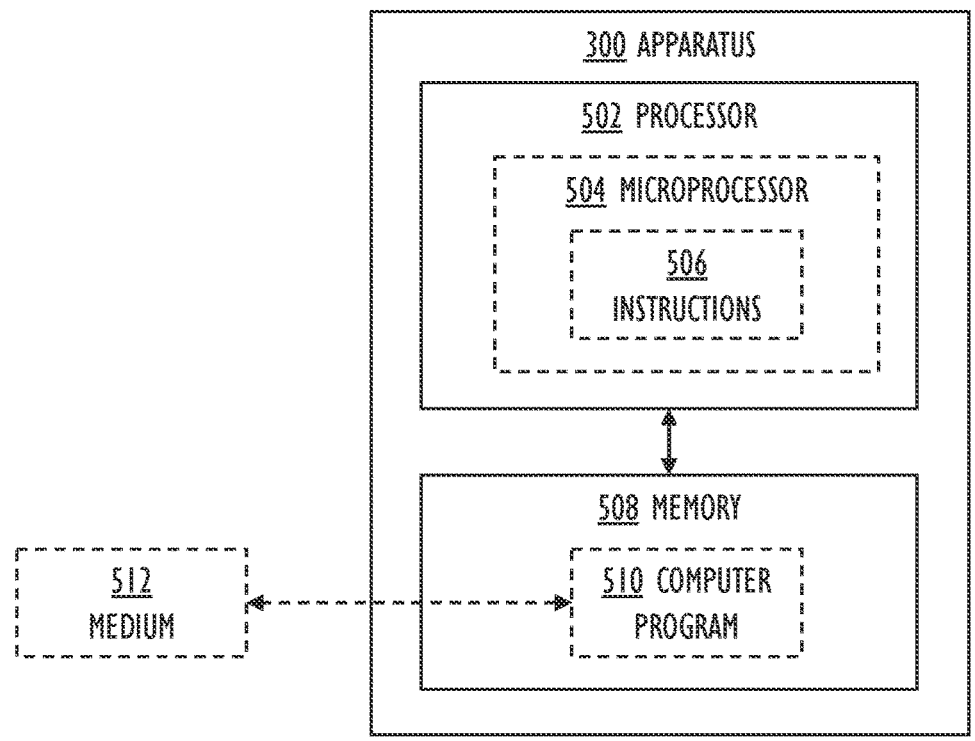
FIG. 5A and FIG. 5B are block diagrams illustrating examples of a cybersecurity apparatus.
Figure 5B:
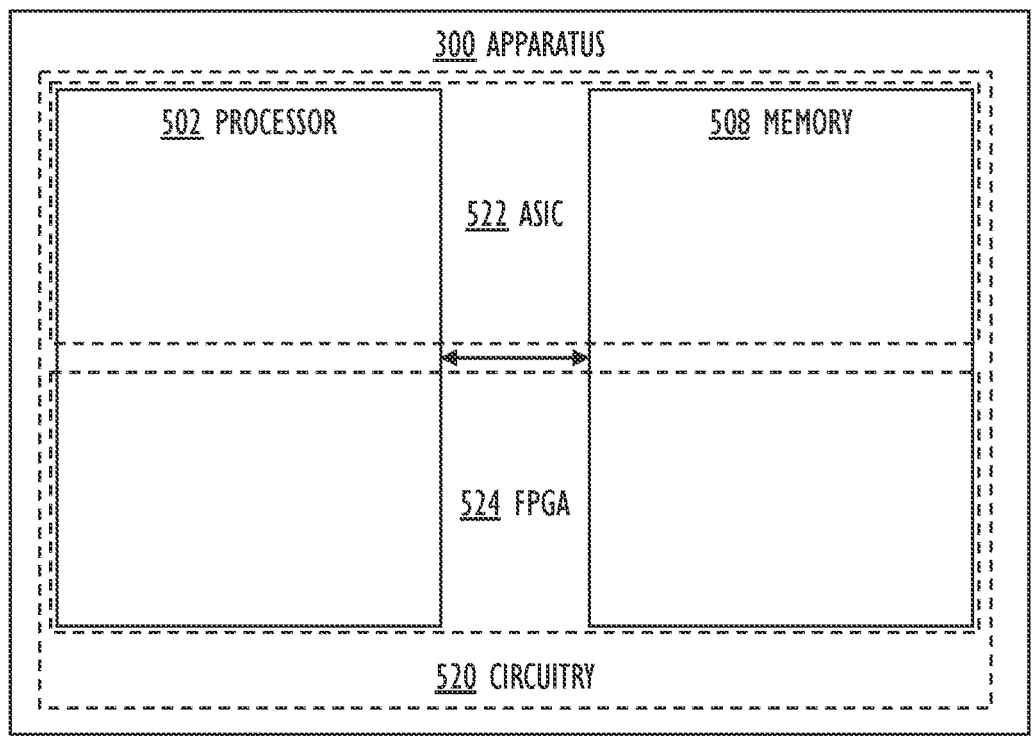

FIG. 5A and FIG. 5B illustrate examples of a cybersecurity apparatus 300, which is also illustrated in FIG. 3 as performing the operations of FIG. 1A and FIG. 1B.

The method described with reference to FIG. 1A and FIG. 1B may be implemented by the cybersecurity apparatus 300. The apparatus 300 may execute the operations defined in the method. The apparatus 300 may implement an algorithm, which includes at least the operations of the method, but may optionally include other operations related to the cybersecurity in general.

The apparatus 300 comprises one or more memories 508, and one or more processors 502 coupled to the one or more memories 508 configured to execute the operations described in FIG. 1A and FIG. 1B.

The term "processor" 502 refers to a device that is capable of processing data. The term "memory" 508 refers to a device that is capable of storing data run-time (=working memory) or permanently (=non-volatile memory).

As shown in FIG. 5A, the one or more processors 502 may be implemented as one or more microprocessors 504, which are configured to execute instructions 506 of a computer program 510 stored on the one or memories 508. The microprocessor 504 implements functions of a central processing unit (CPU) on an integrated circuit. The CPU is a logic machine executing the instructions 506 of the computer program 510. The CPU may comprise a set of registers, an arithmetic logic unit (ALU), and a control unit (CU). The control unit is controlled by a sequence of the instructions 506 transferred to the CPU from the (working) memory 508. The control unit may contain a number of microinstructions for basic operations. The implementation of the microinstructions may vary, depending on the CPU design. The one or more microprocessors 504 may be implemented as cores of a single processor and/or as separate processors. Note that the term "microprocessor" is considered as a general term including, but not being limited to a digital signal processor (DSP), a digital signal controller, a graphics processing unit, a system on a chip, a microcontroller, a special-purpose computer chip, and other computing architectures employing at least partly microprocessor technology. The memory 508 comprising the working memory and the non-volatile memory may be implemented by a random-access memory (RAM), dynamic RAM (DRAM), static RAM (SRAM), a flash memory, a solid-state drive (SSD), PROM (programmable read-only memory), a suitable semiconductor, or any other means of implementing an electrical computer memory.

The computer program ("software") 510 may be written ("coded") by a suitable programming language, and the resulting executable code may be stored in the memory 508 and executed by the one or more microprocessors 504.

The computer program 510 implements the method/algorithm. The computer program 510 may be coded using a programming language, which may be a high-level programming language, such as Java, C, or C++, or with a low-level programming language, such as an assembler or a machine language. The computer program 510 may be in source code form, object code form, executable file, or in some intermediate form, but for use in the one or more microprocessors 504 it is in an executable form as an application. There are many ways to structure the computer program 510: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program 510 for performing a wide variety of standard operations. In addition, an operating system (such as a general-purpose operating system) may provide the computer program 510 with system services.

As shown in FIG. 5A, a computer-readable medium 512 may store the computer program 510, which, when executed by the apparatus 300 (the computer program 510 may first be loaded into the one or more microprocessors 504 as the instructions 506 and then executed by one or more microprocessors 504), causes the apparatus 300 (or the one or more microprocessors 504) to carry out the method/algorithm. The computer-readable medium 512 may be implemented as a non-transitory computer-readable storage medium, a computer-readable storage medium, a computer memory, a computer-readable data carrier (such as an electrical carrier signal), a data carrier signal (such as a wired or wireless telecommunications signal), or another software distribution medium capable of carrying the computer program 510 to the one or memories 508 of the apparatus 300. In some jurisdictions, depending on the legislation and the patent practice, the computer-readable medium 512 may not be the wired or wireless telecommunications signal.

As shown in FIG. 5B, the one or more processors 502 and the one or more memories 508 may be implemented by a circuitry 520. A non-exhaustive list of implementation techniques for the circuitry 520 includes, but is not limited to application-specific integrated circuits (ASIC) 522, field-programmable gate arrays (FPGA) 524, application-specific standard products (ASSP), standard integrated circuits, logic components, and other electronics structures employing custom-made or standard electronic circuits.

Note that in modern computing environments a hybrid implementation employing both the microprocessor technology of FIG. 5A and the custom or standard circuitry of FIG. 5B is feasible.

Functionality of the apparatus 300, including the capability to carry out the method/algorithm, may be implemented in a centralized fashion by a stand-alone single physical unit, or alternatively in a distributed fashion using more than one communicatively coupled physical units. The physical unit may be a computer, or another type of a general-purpose off-the-shelf computing device, as opposed to a purpose-build proprietary equipment, whereby research and development costs will be lower as only the special-purpose software (and necessarily not the hardware) needs to be designed, implemented, tested, and produced. However, if highly optimized performance is required, the physical unit may be implemented with proprietary or standard circuitry as described earlier.

Figure 6:
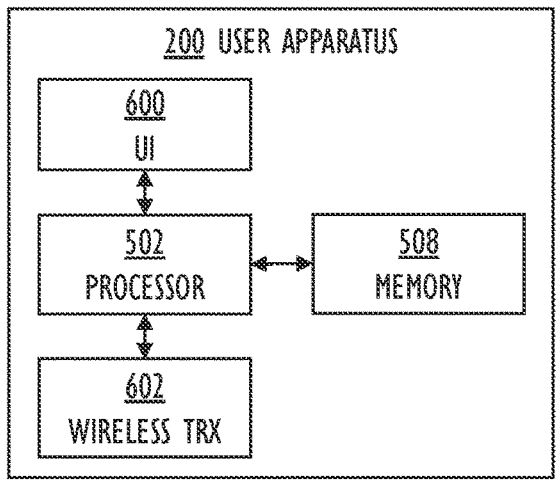
FIG. 6 is a block diagram illustrating an example of a user apparatus.

FIG. 6 illustrates an example of a user apparatus 200 as the apparatus 300. The user apparatus 200 may be a terminal, a user equipment (UE), a radio terminal, a subscriber terminal, a smartphone, a mobile station, a mobile phone, a desktop computer, a portable computer, a laptop computer, a tablet computer, a smartwatch, smartglasses, a game terminal, or some other type of a wired or wireless mobile or stationary communication device operating with or without a subscriber identification module (SIM) or an eSIM (embedded SIM). As shown in FIG. 6, the user apparatus 200 comprises the one or more memories 508, and the one or more processors 502 coupled to the one or more memories 508 configured to carry out the method/algorithm. In addition, the user apparatus 200 comprises a user interface 600 (such as a touch screen), and one or more wireless transceivers (such as a WLAN transceiver, a cellular radio network transceiver, and a short-range radio transceiver) 602. As shown in FIG. 2 and FIG. 4, the user apparatus 200A, 200B, may be running a cybersecurity application 204, 204A, 204B.

Figure 7:
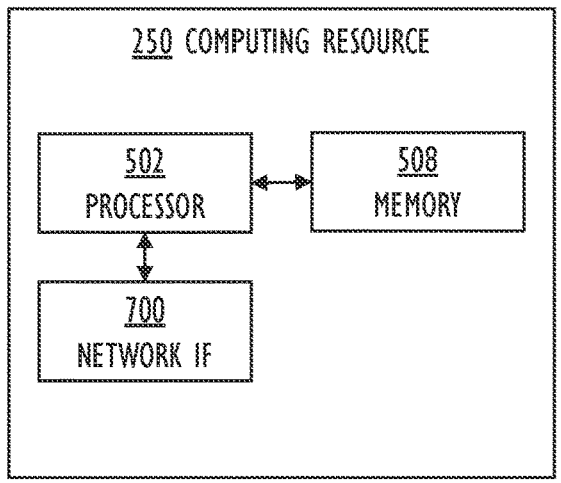
FIG. 7 is a block diagram illustrating an example of a computing resource.

FIG. 7 illustrates an example of a computing resource 250 such as a server apparatus as the apparatus 300. The server apparatus 250 may be a networked computer server, which interoperates with the user apparatus 200A, 200B and/or with the CPE 240 according to a client-server architecture, a cloud computing architecture, a peer-to-peer system, or another applicable distributed computing architecture. As shown in FIG. 7, the server apparatus 250 comprises the one or more memories 508, and the one or more processors 502 coupled to the one or more memories 508 configured to carry out the method/algorithm. In addition, the server apparatus 250 comprises a network interface (such as an Ethernet network interface card) 700 configured to couple the server apparatus 250 to the Internet 410. As shown in FIG. 4, the computing resource 250 may be running a cybersecurity application 252, such as a cybersecurity server application 252.

Figure 8A:
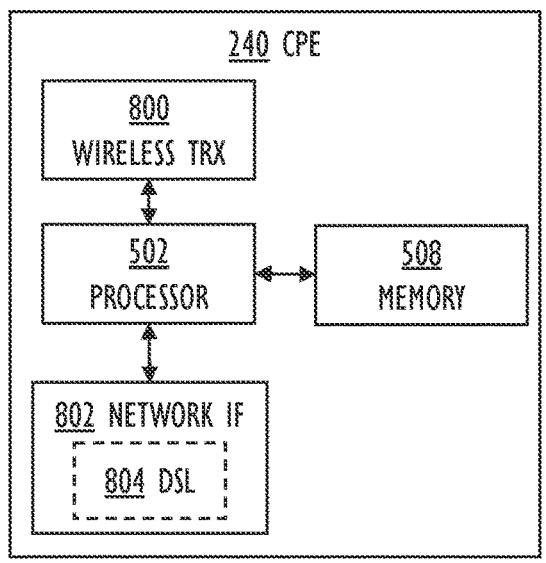
FIG. 8A and FIG. 8B are block diagrams illustrating examples of a customer-premises equipment.
Figure 8B:
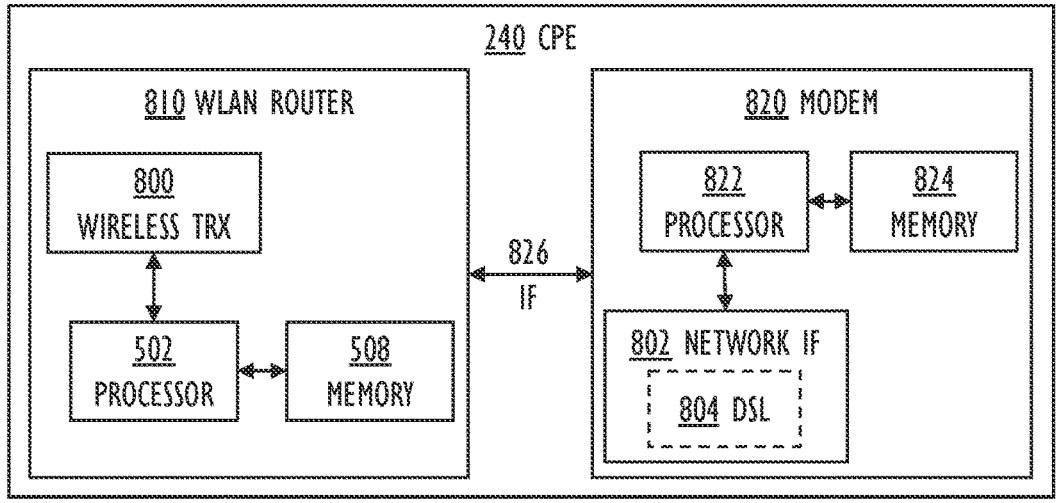

FIG. 8A and FIG. 8B illustrate examples of a customer-premises equipment 240 as the apparatus 300.

In FIG. 8A, the CPE 240 is an integrated apparatus comprising the one or more memories 508, and the one or more processors 502 coupled to the one or more memories 508 configured to carry out the method/algorithm. Additionally, the CPE 240 comprises a wireless radio transceiver 800 configured to create the WLAN 402 for enabling access by the user apparatus 200A. The CPE 240 also comprises a network interface 802 to act as a modem configured to connect to the telecommunication circuit of the carrier at the demarcation point. The network interface 802 may operate as a DSL (Digital Subscriber Line) modem 804 using different variant such as VDSL (Very high-speed DSL), SDSL (Symmetric DSL), or ADSL (Asymmetric DSL). As shown in FIG. 4, the CPE 240 may be running a cybersecurity application, such as a cybersecurity client application 242.

In FIG. 8B, the CPE 240 is a two-part apparatus. A WLAN router part 810 comprises the one or more memories 508, the one or more processors 502 coupled to the one or more memories 508 configured to carry out the method/algorithm, and the wireless transceiver 800 to create the WLAN 402 for enabling access by the user apparatus 200A. A modem part 820 comprises one or more processors 822 coupled to one or more memories 824 configured to carry out modem operations, and the network interface 802 to act as the modem configured to connect to the telecommunication circuit of the carrier at the demarcation point. The WLAN router part 810 may be purchased by the user of the user apparatus 200A to gain access to the method/algorithm, whereas the modem part 820 may be provided by a carrier providing the telecommunication circuit access. As shown in FIG. 8B, the WLAN router part 810 and the modem part 820 may be communicatively coupled by an interface 826 (such as a wired Ethernet interface).

As illustrated in FIG. 4, the functionality of the apparatus 300, including the capability to carry out the method/algorithm, may be implemented in a centralized fashion by a stand-alone single physical unit, or alternatively in a distributed fashion using more than one communicatively coupled physical units.

These physical units comprise the user apparatus 200A at the home or office 400 running the cybersecurity application 204A with a home or office functionality, the user apparatus 200B on the move 420 running a cybersecurity application 204B with an on the move functionality, the CPE 240 running the cybersecurity client application 242, and the computing resource 250 running a cybersecurity server application 252. The method/algorithm operations may be implemented by one or more of these apparatuses 200A/200B/240/250 executing the cybersecurity applications 204A/204B/242/252.

As can be understood by the person skilled in the art, the method/algorithm operations may be distributed among the distributed software comprising the cybersecurity application 204A, 204B, the cybersecurity client application 242, and the cybersecurity server application 252 in numerous different configurations. In a first example, the cybersecurity application with the home functionality 204A communicates with the cybersecurity client application 242 and/or the cybersecurity server application 252 to implement the method/algorithm functionality. In a second example, the cybersecurity client application 242 communicates with the cybersecurity server application 252 to implement the method/algorithm functionality. In a third example, the cybersecurity application with the on the move functionality 204B communicates with the cybersecurity server application 252 to implement the method/algorithm functionality.

Thus, the cybersecurity application 204, 204A, 204B may comprise a stand-alone functionality to carry out the method/algorithm, or a part of the functionality, augmented by functionality of the cybersecurity client application 242 and/or by a functionality of the cybersecurity server application 252. Alternatively, the cybersecurity client application 242 may comprise a stand-alone fashion to carry out the method/algorithm, or a part of the functionality augmented by the functionality of the cybersecurity server application 252. As an additional alternative, the cybersecurity server application 252 may comprise a stand-alone fashion to carry out the method/algorithm. The cybersecurity application 204, 204A, 204B, and/or the cybersecurity client application 242 may operate as a frontend with a relatively limited resources as regards to the processor and memory, whereas the cybersecurity server application 252 may operate as a backend with a relatively unlimited resources as regards to the processor and memory, and the capability to serve a very large number of the user apparatuses 200A, 200B simultaneously.

Even though the invention has been described with reference to one or more examples according to the accompanying drawings, it is clear that the invention is not restricted thereto but can be modified in several ways within the scope of the appended claims. All words and expressions should be interpreted broadly, and they are intended to illustrate, not to restrict, the examples. As technology advances, the inventive concept defined by the claims can be implemented in various ways.

What is claimed is:

1. A computer-implemented method comprising:
   intercepting present network data related to a present data connection of a user apparatus;
   analyzing the present network data; and
   in response to determining that the user apparatus utilizes a privacy feature in the present data connection implemented by a first internet relay and a second internet relay, blocking the present data connection, wherein the privacy feature hides an Internet Protocol (IP) address of the user apparatus by routing the present data connection through the first internet relay and the second internet relay, such that the IP address of the user apparatus is visible to the first internet relay and a domain name record related to the present data connection is not visible to the first internet relay and the IP address of the user apparatus is not visible to the second internet relay and the domain name record related to the present data connection is visible to the second internet relay; and
   subsequent to blocking the present data connection, instructing the user apparatus to not use the privacy feature for a future data connection.

2. The method of claim 1, wherein, in response to determining that the user apparatus utilizes the privacy feature in the present data connection implemented by the first internet relay and the second internet relay, blocking the present data connection further comprises:
in response to determining that the user apparatus utilizes the privacy feature in the present data connection implemented by the first internet relay and the second internet relay and that the user apparatus is subjected to a parental or enterprise cybersecurity control function, blocking the present data connection.

3. The method of claim 1, wherein instructing the user apparatus to not use the privacy feature for the future data connection further comprises instructing the user apparatus to use a network extension feature instead of the privacy feature for the future data connection.

4. The method of claim 3, wherein the network extension feature operates without a virtual private network feature, and wherein the method is executed in one or more of a customer-premises equipment, a network accessible computing resource and the user apparatus.

5. The method of claim 3, wherein the network extension feature operates with a virtual private network feature, and wherein the method is executed in one or more of a customer-premises equipment acting as a virtual private network server and the user apparatus.

6. The method of claim 1, further comprising:
intercepting future network data related to the future data connection of the user apparatus;
analyzing the future network data; and
in response to determining that a cybersecurity action is necessary, performing a cybersecurity action related to one or more of the future data connection and the user apparatus.

7. The method of claim 6, wherein analyzing the future network data comprises checking a reputation of a website related to the future data connection, and wherein performing the cybersecurity action related to the one or more of the future data connection and the user apparatus comprises blocking the future data connection in response to determining that the reputation of the website is malicious.

8. The method of claim 1, wherein the privacy feature comprises a private relay.

9. The method of claim 1, wherein the first internet relay replaces an internet protocol address of the user apparatus with an approximate geographic location area of the user apparatus.

10. The method of claim 1, wherein the user apparatus encrypts one or more domain name system records related to the present data connection due to the use of the privacy feature, and the second internet relay decrypts the one or more domain name system records to connect the user apparatus to a requested website defined in the one or more domain name system records.

11. The method of claim 1, wherein determining that the user apparatus utilizes the privacy feature in the present data connection implemented by the first internet relay and the second internet relay comprises detecting fulfilment of one or more predetermined conditions, the one or more predetermined conditions comprising:
a detection that the user apparatus opens the present data connection to the first internet relay based on an identity of the first internet relay matching with an identity in a set of known identities associated with the privacy feature;
a detection that the user apparatus makes a domain name system query for a domain matching with a domain in a set of known domains associated with the privacy feature;
a detection that the user apparatus opens the present data connection to the first internet relay as a QUIC connection; and
a detection of a QUIC transport layer security client hello server name indication matching with a domain in the set of known domains associated with the privacy feature.

12. The method of claim 1, wherein the first internet relay comprises an ingress proxy server, and the second internet relay comprises an egress proxy server.

13. An apparatus comprising:
one or more memories; and
one or more processors coupled to the one or more memories configured to:
intercept present network data related to a present data connection of a user apparatus;
analyze the present network data; and
in response to determining that the user apparatus utilizes a privacy feature in the present data connection implemented by a first internet relay and a second internet relay, block the present data connection, wherein the privacy feature hides an Internet Protocol (IP) address of the user apparatus by routing the present data connection through the first internet relay and the second internet relay, such that the IP address of the user apparatus is visible to the first internet relay and a domain name record related to the present data connection is not visible to the first internet relay and the IP address of the user apparatus is not visible to the second internet relay and the domain name record related to the present data connection is visible to the second internet relay; and
subsequent to blocking the present data connection, instruct the user apparatus to not use the privacy feature for a future data connection.

14. The apparatus of claim 13, wherein in response to determining that the user apparatus utilizes the privacy feature in the present data connection implemented by the first internet relay and the second internet relay, block the present data connection, the one or more processors coupled to the one or more memories are further configured to:
in response to determining that the user apparatus utilizes the privacy feature in the present data connection implemented by the first internet relay and the second internet relay and that the user apparatus is subjected to a parental or enterprise cybersecurity control function, block the present data connection.

15. The apparatus of claim 13, wherein the one or more processors coupled to the one or more memories are further configured to:
subsequent to blocking the present data connection, instruct the user apparatus to use a network extension feature instead of the privacy feature for the future data connection.

16. The apparatus of claim 13, wherein to determine that the user apparatus utilizes the privacy feature in the present data connection implemented by the first internet relay and the second internet relay, the one or more processors are further configured to detect fulfilment of one or more predetermined conditions, the one or more predetermined conditions comprising:
a detection that the user apparatus opens the present data connection to the first internet relay based on an identity of the first internet relay matching with an identity in a set of known identities associated with the privacy feature;

a detection that the user apparatus makes a domain name system query for a domain matching with a domain in a set of known domains associated with the privacy feature;

a detection that the user apparatus opens the present data connection to the first internet relay as a QUIC connection; and a detection of a QUIC transport layer security client hello server name indication matching with a domain in the set of known domains associated with the privacy feature.

17. A non-transitory computer-readable medium comprising a computer program with instructions which, when executed by an apparatus, cause the apparatus to:

intercept present network data related to a present data connection of a user apparatus;

analyze the present network data;

in response to determining that the user apparatus utilizes a privacy feature in the present data connection implemented by a first internet relay and a second internet relay, block the present data connection, wherein the privacy feature hides an Internet Protocol (IP) address of the user apparatus by routing the present data connection through the first internet relay and the second internet relay, such that the IP address of the user apparatus is visible to the first internet relay and a domain name record related to the present data connection is not visible to the first internet relay and the IP address of the user apparatus is not visible to the second internet relay and the domain name record related to the present data connection is visible to the second internet relay; and subsequent to blocking the present data connection, instruct the user apparatus to not use the privacy feature for a future data connection.

18. The medium of claim 17, wherein in response to determining that the user apparatus utilizes the privacy feature in the present data connection implemented by the first internet relay and the second internet relay, block the present data connection, the instructions further cause the apparatus to:

in response to determining that the user apparatus utilizes the privacy feature in the present data connection implemented by the first internet relay and the second internet relay and that the user apparatus is subjected to a parental or enterprise cybersecurity control function, block the present data connection.

19. The medium of claim 17, wherein the instructions further cause the apparatus to:

subsequent to blocking the present data connection, instruct the user apparatus to use a network extension feature instead of the privacy feature for the future data connection.

20. The medium of claim 17, wherein to determine that the user apparatus utilizes the privacy feature in the present data connection implemented by the first internet relay and the second internet relay, the instructions further cause the apparatus to detect fulfilment of one or more predetermined conditions, the one or more predetermined conditions comprising:

a detection that the user apparatus opens the present data connection to the first internet relay based on an identity of the first internet relay matching with an identity in a set of known identities associated with the privacy feature;

a detection that the user apparatus makes a domain name system query for a domain matching with a domain in a set of known domains associated with the privacy feature;

a detection that the user apparatus opens the present data connection to the first internet relay as a QUIC connection; and a detection of a QUIC transport layer security client hello server name indication matching with a domain in a set of known domains associated with the privacy feature.

* * * * *